(12) United States Patent
Li et al.

(10) Patent No.: US 7,444,877 B2
(45) Date of Patent: Nov. 4, 2008

(54) OPTICAL WAVEGUIDE VIBRATION SENSOR FOR USE IN HEARING AID

(75) Inventors: Guann-Pyng Li, Irvine, CA (US); Mark Bachman, Irvine, CA (US); Tao Xu, Irvine, CA (US); Fan-Gang Zeng, Irvine, CA (US); Patrick Coffey, Mission Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 485 days.

(21) Appl. No.: 10/525,279

(22) PCT Filed: Aug. 20, 2003

(86) PCT No.: PCT/US03/26050

§ 371 (c)(1),
(2), (4) Date: Dec. 27, 2005

(87) PCT Pub. No.: WO2004/018980

PCT Pub. Date: Mar. 4, 2004

(65) Prior Publication Data

US 2006/0107744 A1    May 25, 2006

Related U.S. Application Data

(60) Provisional application No. 60/404,834, filed on Aug. 20, 2002.

(51) Int. Cl.
*G01D 5/353* (2006.01)
*H04R 25/02* (2006.01)
*G01D 21/00* (2006.01)

(52) U.S. Cl. ............ 73/651; 73/655; 381/312; 381/313; 381/328; 29/896.21; 398/134

(58) Field of Classification Search ............ 73/649, 73/651, 655–657; 381/312, 313, 328; 29/896.21; 398/134, 135

See application file for complete search history.

(56) References Cited

U.S. PATENT DOCUMENTS 3,213,197 A * 10/1965 Hawkins .................. 73/579

(Continued)

FOREIGN PATENT DOCUMENTS

| JP | 10-48039 | | 2/1998 |
| WO | WO 86/05271 | * | 9/1986 |
| WO | WO 00/25550 | | 5/2000 |

OTHER PUBLICATIONS

NA9006371, Optical Microphone, IBM Technical Disclosure Bulletin, Jun. 1990, US, vol. 33, Issue 1A, pp. 371-377.*

(Continued)

*Primary Examiner*—Hezron E. Williams
*Assistant Examiner*—Rose M Miller
(74) *Attorney, Agent, or Firm*—Robert D. Buyan; Stout, Uxa, Buyan & Mullins, LLP (57) ABSTRACT

A directionally-sensitive device for detecting and processing vibration waves includes an array of polymeric optical waveguide resonators positioned between a light source, such as an LED array, and a light detector, such as a photodiode array. The resonators which are preferably oriented substantially perpendicularly with respect to incoming vibration waves, vibrate when a wave is detected, thus modulating light signals that are transmitted between the light source and the light detector. The light detector converts the modulated light into electrical signals which, in a preferred embodiment, are used to drive either the speaker of a hearing aid or the electrode array of a cochlear implant. The device is manufactured using a combination of traditional semiconductor processes and polymer microfabrication techniques.

51 Claims, 8 Drawing Sheets

U.S. PATENT DOCUMENTS

| | | | |
|---|---|---|---|
| 3,332,757 A * | 7/1967 | Hawkins | 65/410 |
| 3,333,278 A * | 7/1967 | Hawkins et al. | 156/155 |
| 3,716,659 A | 2/1973 | Korpel | |
| 4,538,140 A * | 8/1985 | Prestel | 340/556 |
| 4,678,905 A * | 7/1987 | Phillips | 250/227.21 |
| 4,822,999 A | 4/1989 | Parr | |
| 5,891,747 A * | 4/1999 | Farah | 438/31 |
| 6,079,274 A | 6/2000 | Ando et al. | |
| 6,092,422 A | 7/2000 | Binnig et al. | |
| 6,223,601 B1 | 5/2001 | Harada et al. | |
| 6,491,644 B1 * | 12/2002 | Vujanic et al. | 600/559 |

OTHER PUBLICATIONS

Tanaka, et al., A Novel Mechanical Cochlea 'Fishbone' with Dual Sensor/Actuator Characteristics, IEEE/ASME Transactions on Mechtronics, vol. 3, No. 2, Jun. 1998, pp. 98-105.

* cited by examiner

OPTICAL WAVEGUIDE VIBRATION SENSOR FOR USE IN HEARING AID

RELATED APPLICATIONS

This application claims the benefit of U.S. Provisional Application Ser. No. 60/404,834 filed Aug. 20, 2002. The entire disclosure of this provisional application is expressly incorporated herein by reference.

FIELD OF THE INVENTION

The present invention relates generally to devices and methods for detecting vibrations and converting such vibrations into electrical signals In a particularly useful embodiment, the invention relates to a method and device for enhancing hearing in a human or veterinary patient, and to methods of making and using the device.

BACKGROUND OF THE INVENTION

Vibration detectors and transducers are used in a wide variety of applications. For instance, vibration detectors may be incorporated into buildings, bridges, or other structures to warn of seismic or other potentially destructive vibrations. Similarly, vibration dectectors may provided on industrial equipment such as engines, valves, pumps, fans and the like to indicate dangerous conditions.

One particular class of vibration detectors comprises acoustic detectors, wherein the vibrations to be detected are in the audible range. Such detectors are used in conventional microphones, as well as in more sophisticated speech recognition systems, noise-suppression systems, and the like.

The trend in recent years has been toward replacing conventional vibration detectors and/or microphones with highly miniaturized, micromechanical elements, which among other things, are less expensive to manufacture than their larger predecessors. One type of micromechanical vibration sensor comprises an array of resonators, each having a different resonant frequency, and detection means, such as piezoelectric elements, strain detecting elements, and capacitive elements, for detecting the output generated by the resonance of the resonators. Examples of this type of vibration sensor can be found in U.S. Pat. No. 6,079,274 to Ando et al., U.S. Pat. No. 6,092,422, to Binnig et al., and U.S. Pat. No. 6,223,601 to Harada et al., the contents of each of which are incoporated herein by reference.

One particularly useful application of vibration detectors/transducers has been in the field of hearing enhancement technology. In general, hearing enhancement technology is used to compensate for hearing loss that can not be reversed through medication or surgery. This type of hearing loss, typically caused by malfunctioning of the inner ear or auditory nerve, is known as sensori-neural hearing loss.

Many people with mild-to-moderate sensori-neural hearing loss can use hearing aids to amplify sounds. However, hearing aids are generally ineffective for people with severe or profound sensori-neural hearing loss. Such people often require cochlear implants, which convert sound into electrical impulses that directly stimulate the nerve endings in the cochlea.

Both hearing aids and cochlear implants employ microphones to sense sound and signal processors to analyze and make the sound more recognizable, while filtering noise and ambient sounds. Currently, most signal processors employ digital signal processing (DSP) technology. However this technology requires relatively large and expensive microelectronic chipsets that consume large amounts of power, typically 150-750 mW for a cochlear implant. Consequently, the devices require large battery packs and body-worn accessories to produce the electrical signals needed for the deaf to hear. Furthermore, the battery life is often limited to less than a day, requiring frequent recharging of the devices.

The expense, bulky size, and weight of the current technology means that the majority of the hearing impaired population cannot truly benefit from the technology. Small DSP-based devices are prohibitively expensive to most people. Body-worn accessories and frequent re-charging requirements make the devices less desirable for active people and children, resulting in a significant impact on the quality of life for the hearing impaired members of the population.

Another disadvantage of some currently available hearing devices is that they are not directionally sensitive. In other words, although the devices are capable of analyzing and filtering sounds, their output is not affected by the orientation of the device relative to the incoming sound waves. As a result, the user can hear sounds, but can not tell where the sounds are coming from. This can be a safety issue in certain situations, for instance for drivers or pedestrians who need to know where they are in relation to oncoming vehicles before they can see them.

One suggested alternative to the current technology is to use resonator arrays of the type described in the above-listed patents to Ando at al., Binnig et al, and Harada et al., rather than a single microphone. By adjusting the output efficiency of each resonator, one can accomplish frequency filtering, and remove the need for DSP-based filtering. The resonator array can thus be thought of as a "piano in the ear", where each key resonates at a specific frequency, making it a mechanical frequency filter.

A simple resonator device based on the above idea was described in Tanaka et al., "A Novel Mechanical Cochlea "Fishbone" with Dual Sensor/Actuator Characteristics," IEEE/ASME Transactions on Mechtronics, Vol. 3, No. 2, June 1998, pp. 98-105, the contents of which are incorporated in their entirety herein by reference. The resonator device, micromachined from silicon, consists of an array of cantilevers lined along a single transverse base. The "fishbone" (so-called because of its shape similarity to the skeleton of a fish) acts as a multifrequency sensor—each individual cantilever responding to a different acoustic frequency. A prototype of the resonator device displayed good frequency selectivity over a frequency range of 1.4 kHz to 7 kHz, but still had three major drawbacks. First, the natural range of frequencies for this device could not extend to the low frequencies (under 1 kHz). Second, the resonators had a very high efficiency, or Q-factor $Q_{10}$, causing them to resonate long after the original sound had stopped (this makes an "echo" or "ringing" sound). Third, there was no easy way to convert the vibrating silicon cantilevers into electrical energy.

Accordingly, a need exists for new and improved devices and methods for detecting and processing sounds, and for applying these devices and methods in the field of hearing enhancement technology. More specifically, there is a need for small, low-cost, low-power sound detecting and processing devices that are free of electromagnetic interference and suitable for use in both hearing aids and cochlear implants. Furthermore, such devices should be directionally sensitive, respond to a large range of frequencies, including low frequencies (under 1 kHz), and display suitable damping of the sound after the source has stopped.

SUMMARY OF THE INVENTION

The present invention provides devices and methods for detecting and processing vibration waves. In a particularly useful embodiment of the invention, a directionally sensitive apparatus for detecting and processing vibration waves in the acoustic range is incorporated into a device for enhancing hearing in a human or veterinary patient.

Broadly, the apparatus according to the present invention comprises an array of optical waveguide resonators positioned between a light source, such as an LED array, and a light detector, such as a photodiode array. Preferably, each of the resonators is a cantilever, each cantilever having a different length and, therefore, a different resonant frequency. When a vibration wave passes through the array, each frequency component of the wave will excite the resonance of a corresponding cantilever. At the same time, the resonating cantilevers act as optical waveguides that modulate the intensity of the light traveling between the light source and the light detector. Each resonating cantilever indicates that the frequency component corresponding to that cantilever exists in the vibration wave, while the amplitude of the resonance indicates the intensity of the frequency component. Therefore, the cantilever array produces an output spectra equivalent to that obtained through Fourier transform or wavelet analysis.

Tests have shown that the output of the cantilever array is sensitive to the orientation of the cantilevers relative the incoming sound waves. Specifically, the amplitude of resonance is highest when the cantilevers are substantially perpendicular to the incoming sound waves. Accordingly, the device can be used to locate the source of a sound, as well as to process its amplitude and frequencies.

Further in accordance with the invention, the cantilevers may be fully or partially formed of a transparent polymer material. Such material may have properties similar to the natural organic material found in the basilar membrane of the human cochlea, and may have a sufficiently high index of refraction for use as a waveguide. Preferably, the polymer material has a lower Young's Modulus than silicon, and cantilevers made from the polymer material will have a lower quality factor $Q_{10}$ than identically dimensioned cantilevers made of silicon ($Q_{10}$ is the peak frequency of the resonator divided by the bandwidth 10 dB below the peak). Suitable polymers include, but are not limited to polymer epoxy, polycarbonate, and clear polyurethane elastomer.

Still further in accordance with the invention, there is provided a method for detecting and processing vibrations comprising the steps of a) providing a plurality of optical waveguide resonators, each having a different resonant frequency; b) causing the optical waveguide resonators to receive sounds; directing light through the resonators, such that the light is modulated by vibration of at least one of the resonators; c) receiving the modulated light; and d) converting the modulated light into electrical signals.

Still further in accordance with the invention, a sound detecting and processing apparatus of the above described character may be sized and adapted for use as or in a hearing enhancement device, such as a hearing aid or cochlear implant. In this application, the light source, resonator array, and light detector are integrated onto a single, thumbnail size platform, preferably measuring about 10 mm long and 4 mm in diameter. The device may be encased in or attached to a housing, soft pad or pillor or other article adapted to be worn on and/or implanted in the body of a hearing-impaired patient. For instance, the housing may be configured to fit into the patient's ear canal, or to be implanted in the patient's middle ear or mastoid cavity. Preferably, the housing is configured to maintain the resonator array in an acoustically optimum position relative to incoming sound waves. In the case of a hearing aid worn in a patient's ear canal, this means that the cantilevers should be oriented substantially perpendicularly with respect to the ear canal. In the case of a device implanted in the middle ear, the cantilevers should be oriented substantially parallel to the patient's tympanic membrane.

Still further in accordance with the present invention, there it provided method for treating hearing loss or impairment comprising the steps of: a) providing a hearing enhancement device as described above, and b) providing an interface between the hearing enhancement device and the inner ear of the patient. In one embodiment of this method, the device is a hearing aid, and the step of providing an interface comprises transmitting the electrical signals from the light detector to a speaker in the hearing aid. In another embodiment, the device is a cochlear implant, and the step of providing an interface comprises implanting one or more electrodes in proximity to the patient's auditory nerve, and driving the electrodes with the electrical signals from the light detector to thereby stimulate the patient's auditory nerve.

Still further in accordance with the present invention, there it provided a method of treating hearing loss or impairment comprising the steps of: a) providing the hearing implant device as described above and a cochlear implant array; b) implanting the electrode array in the cochlea of a patient; c) implanting the hearing device behind the tympanum of the patient; d) connecting the electrode array to the hearing device; e) and implanting an RF/Power receiver coil in the patient. THe device is then tested and, if necessary, the gains are adjusted to obtain optimum hearing for the patient. In embodiments wherein the battery of the device is rechargable any suitable type of recharger may be used. For example, a wireless recharger such as a RF emitting appartus may be used. In at least some embodiments, RF device used to adjust the gains may also be useable to recharge the battery, either currently with or separately from adjustment of the gains.

Still further in accordance with the present invention, there it provided method for making a hearing enhancement device according to the present invention, said method comprising the steps of: a) providing a light source in the form of an LED array, a light detector, in the form of a photo diode array, and optical waveguide resonator array as described above; b) and packaging the arrays in a housing configured to be worn in or on the body of a patient.

In one preferred embodiment of such method Step A comprises providing a silicon chip having an LED, photodiode array, and electronic circuitry for converting light signals into electrical signals formed thereon, forming a cavity in the silicon chip, securing a layer of optical polymeric material to the chip, cutting the polymer layer to form a resonator array, and Step B comprises packaging the arrays in a device housing which is then coupled to a power source such as a battery. The packaged device and battery may be further packaged in a housing (e.g. a box, sponge, pad capsule, disc, pillow, etc. . . . ) that is configured to maintain the device in a desired position within a patient's ear canal, middle ear, or mastod cavity.

Further aspects and advantages of the invention will become apparent to persons of skill in the art upon reading and understanding of the detailed descriptions of the preferred embodiments set forth herebelow.

BRIEF DESCRIPTION OF THE DRAWINGS

FIG. 6- are schematic drawings showing a method of implanting the device of FIG. 6;

DETAILED DESCRIPTION OF PREFERRED EMBODIMENTS

The following detailed description and the accompanying drawings are provided for purposes of describing and illustrating the presently preferred embodiments of the invention only, and are not intended to limit the scope of the invention in any way.

DETAILED DESCRIPTION AND EXAMPLES

Figure 1:
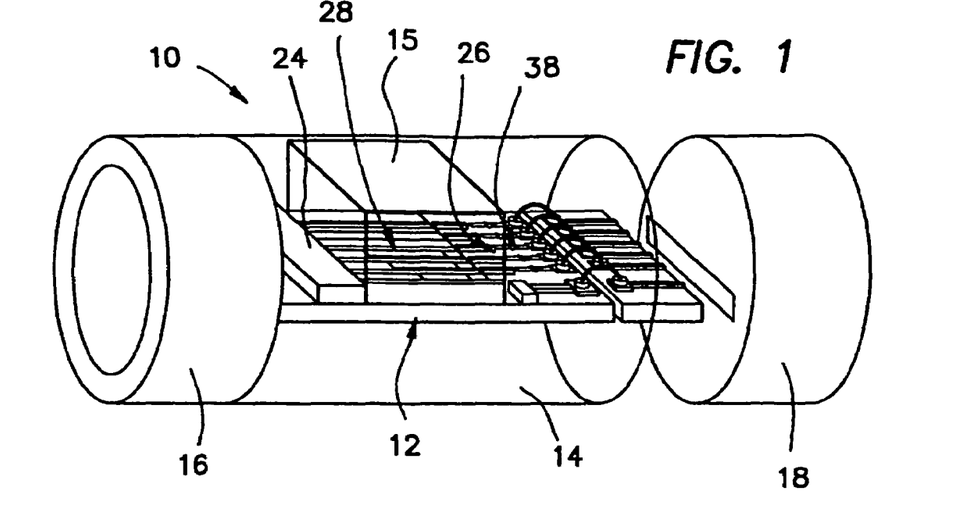
FIG. 1 is a perspective view, partially broken away, showing a hearing enhancement device incorporating a sound detecting and processing apparatus according to the present invention.

FIG. 1 illustrates a hearing enhancement device 10 incorporating a vibration detector/transducer 12 according to the present invention. The vibration detector/transducer 12 is a micro-electrical-mechanical system (MEMS) encased in a device housing 14 (shown here in phantom), which includes an opening 15 for allowing sound to reach the MEMS. The device housing 14 is coupled at one end to a battery housing 16 containing a battery for powering the vibration detector/transducer 12 and at the opposite end to an adapter or end cap 18 configured to facilitate physical interface between the vibration detector/transducer 12 and the inner ear of a hearing-impaired patient.

Figure 2:
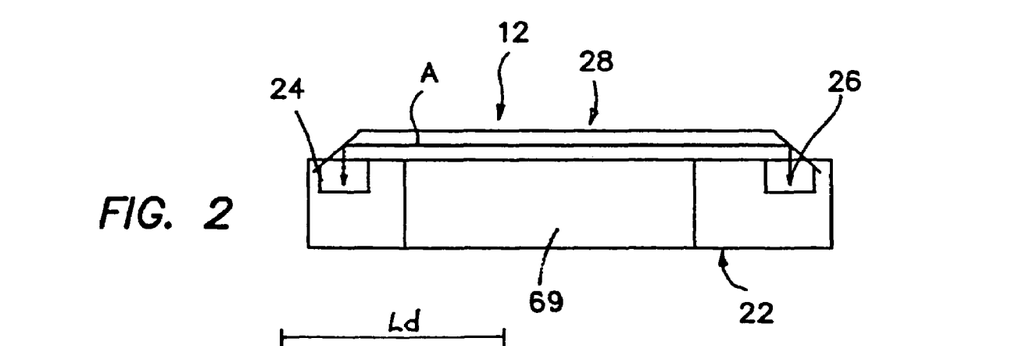
FIG. 2 is a longitudinal sectional view of a sound detecting and processing apparatus according to the present invention.
Figure 3:
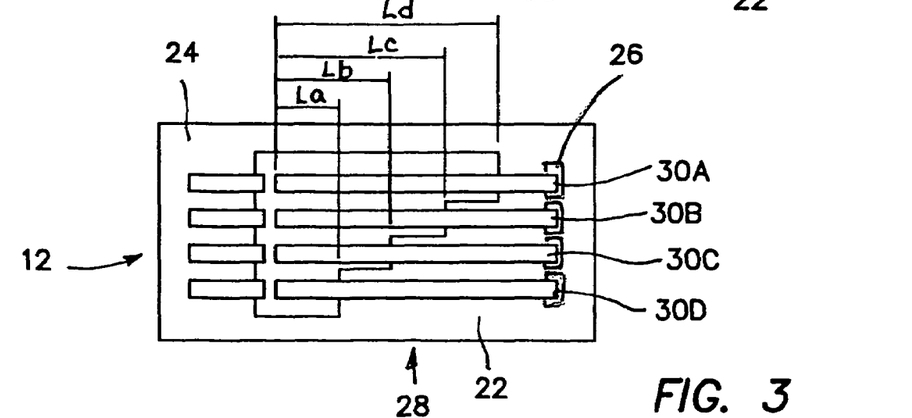
FIG. 3 is a top view of the apparatus of FIG. 2.

Turning now to FIGS. 2 and 3, with continued reference to FIG. 1, the vibration detector/transducer 12 comprises a substrate, substrate 22 having a light source such as an LED array 24 provided at one end, and a light detector such as a photodiode array 26 at the other end. An array of optical waveguide resonators 28 extends between the LED array 24 and the photodiode array 26. The resonator array 28 comprises a plurality of cantilevers $30a, b, c \ldots n$, each having a different length $L_{a,b,c\ldots n}$, and thus a different resonant frequency. For simplification, only four cantilevers 30 are shown here. However, a more complete spectrum of sound can be obtained by increasing the number of cantilevers.

The resonant frequency of each cantilever $30a, b, c \ldots n$, is determined by its length, width, cross-sectional shape and material. Thus, it is not strictly necessary that each cantilever have a different length; each could have the same length, but a different width or shape, or could be made from a different material. However, cantilevers which are identical in all respects except for length are presently preferred for ease of manufacture.

The vibration detector/transducer 12 operates as follows. Light emitted from the LED array 24 travels through the optical waveguide resonator array 28, as shown by arrow A, and is received by the photodiode array 26, before being converted into electrical signals by simple electronic circuitry 38. When a sound wave passes through the resonator array 28, each frequency component of the wave will excite the resonance of a corresponding cantilever, thus modulating the intensity of light traveling through that cantilever. The changes in light intensity caused by vibration of the cantilevers are detected by the photodiode 26, causing corresponding changes in the electrical signals output by the electronic circuitry 32. This produces output spectra equivalent to the spectra obtained through frequency analysis using Fourier transform or wavelet analysis. However, because the resonator array 28 functions as a passive component and filters the frequency mechanically, in parallel operation mode, the vibration detector/transducer 12 requires significantly less power and shorter processing time than would be required by a device using digital signal processing (DSP) technology.

The output of each frequency channel of the vibration detector/transducer 12 can be amplified or attenuated by controlling the intensity of the light for the corresponding cantilever 30.

In order for the vibration detector/transducer 12 to mimic the biological front-end processing in the human cochlea as closely as possible, it is desirable that the material used to form the cantilevers 30 in the resonator array 28 have properties similar to those of the natural organic material found in the basilar membrane of the human cochlea. In particular, cantilevers from this material should be responsive over a large range of frequencies, including frequencies below 1 kHz, and should be able to stop resonating quickly after the original sound has stopped. This latter property, called the efficiency of the resonator, is typically expressed in terms of a quality factor $Q_{10}$, which as defined as the peak frequency of the resonator divided by the bandwidth 10 dB below the peak. In general, a resonator made from a stiff material will have a higher quality factor $Q_{10}$ than an identically-dimensioned resonator made from a less stiff material. Thus, the material used in the cantilevers 30 should have a relatively low stiffness, or Young's Modulus.

By way of example, the hair cells which function as acoustic sensors in the human cochlea have quality factors $Q_{10}$ between 1 and 10 for resonant frequencies in the audio frequency range, while silicon resonators in prior art mechanical filters typically are two orders of magnitude above that.

Accordingly, resonators made of material having a Young's Modulus lower than that of silicon are preferred.

A variety of polymer materials are known to have sufficiently low Young's moduli to achieve the desired quality factors, as well as the transperance and high refractive index needed to enable the resonators to function as optical waveguides. Among such polymers are polymer epoxy, polycarbonate, clear polyurethane elastomer, and combinations thereof. Composite resonators comprising, for instance, opaque, non-polymeric materials having fiber optic strands embedded within could also be used.

A prototype apparatus 12 having four cantilevers 30 fabricated from a transparent epoxy Product Name (Epo-Tek, UV0-114, Epoxy Technolgoy, Billenca, Mass.) having a Young's Modulus of 4.4 GPa was tested in a sound room using a wide variety of audio frequencies, and the current from the photodiode array 26 was monitored. The cantilevers 30a, b, c, d, which were oriented vertically with the direction of the incoming sound waves, had a thickness of 50 µm, width of 100 µm, and lengths of 1.5 mm, 2.4 mm, 4.8 mm, and 7.5 mm, respectively. Spacing between adjacent cantilevers was 100 µm, and spacing between the ends of each cantilever 30 was approximately 20 µm. Data from experiments performed on the apparatus are shown in FIGS. 9A-C.

Figure 9A:
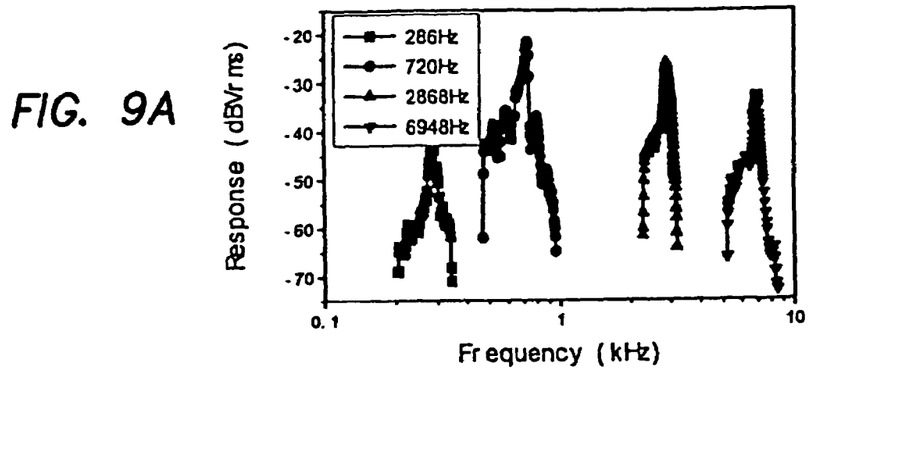
FIGS. 9A-C are curves showing the results of experimental tests performed on a prototype sound detecting and processing apparatus according to the present invention.

FIG. 9A shows the frequency response of the prototype cantilever array. The cantilevers were determined to have a resonant frequencies of 286 H, 720, 2868 Hz, and 6948 Hz, with Q10 values of 9.38, 10.11, 11.56, and 14.01, respectively. These Q10 values are the same order of magnitude as, but a little higher than, those obtained from direct measurement of basilar membrane vibration in a normal mammalian cochlea.

Figure 9B:
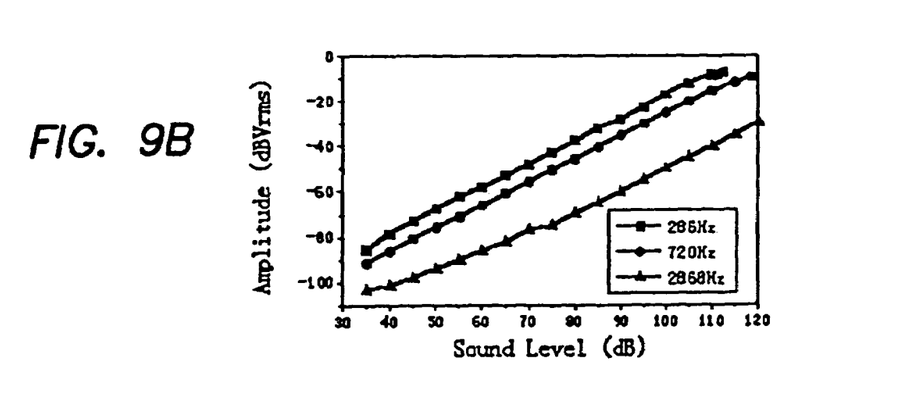

FIG. 9B shows the input/output function of the polymeric cantilevers' responses to tones. Specifically, it shows that for sound inputs between 35 and 115 dB SPL (sound pressure level), the relationship between input sound level and output amplitude is linear. The lower limit of 35 dB is due to background noise while the upper limit of 115 dB is due to the power output of the amplifier used during our measurement. Therefore, the polymeric cantilever array should have a linear dynamic range of more than 80 dB SPL.

Figure 9C:
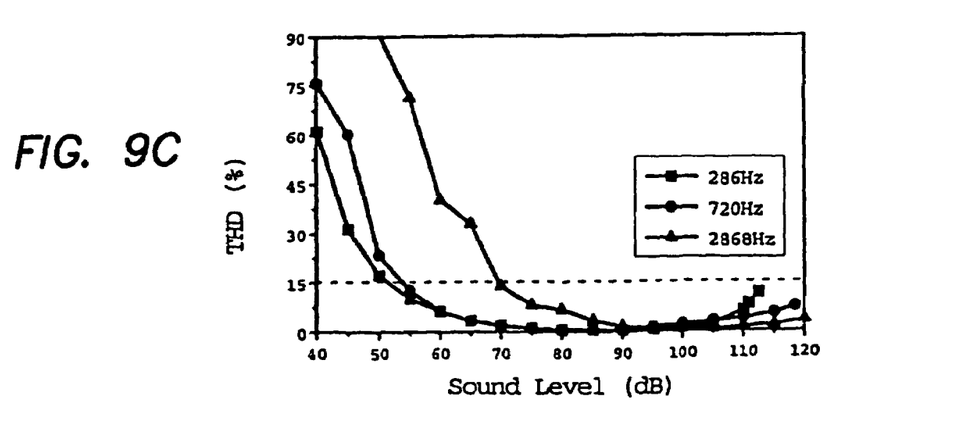

FIG. 9C shows the total harmonic distortions (THD) for the polymeric cantilever array. The figure shows that the harmonic distortion is generally low for loud sounds, but appears to be higher than 15% when the sound level is lower than 50 dB, 55 dB, and 70 dB for the frequencies at 286 Hz, 720 Hz, and 2868 Hz, respectively. However, the THD at low sound in tensities can be reduced with proper acoustic packaging, which will help isolate ambient vibrations from airborne sound.

Another important consideration in a micro-cantilever array of the type disclosed here is cross-talk between cantilevers. The experiments on the prototype apparatus 12 showed that the cross-talk between cantilevers was smaller than −25 dB, which satisfies the typical requirements for hearing applications. In addition, group delay, which indicates the processing speed of the micro-cantilever array signal, was found to be about 9 ms.

Overall, the experiments demonstrated that the mechanical performance of the polymer resonator array 28 was similar to that of the basilar membrane in the cochlea, and that a MEMS 12 incorporating such an array 28 represents a feasible alternative to DSP technology in hearing devices.

Figure 10A:
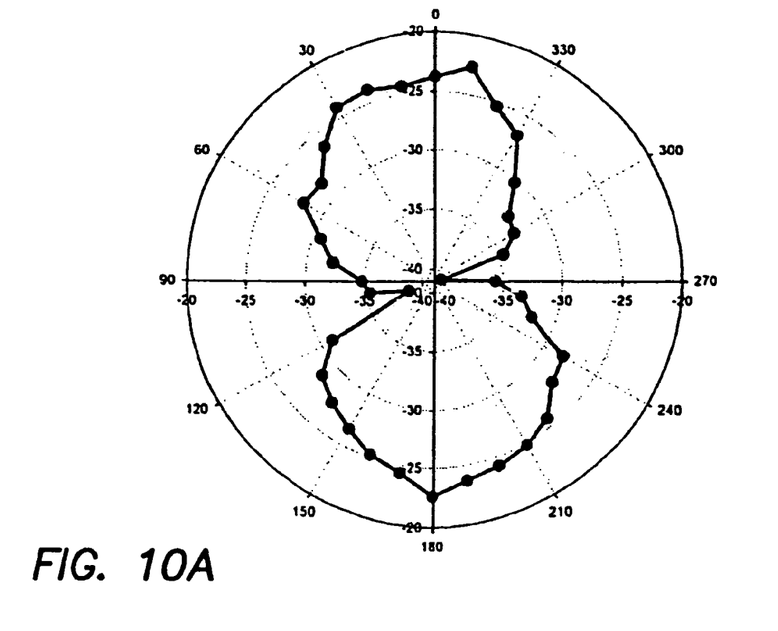
FIGS. 10A and B are polar plots showing the experimentally determined relationship between the angular orientation of the resonator array and the output of the device.
Figure 10B:
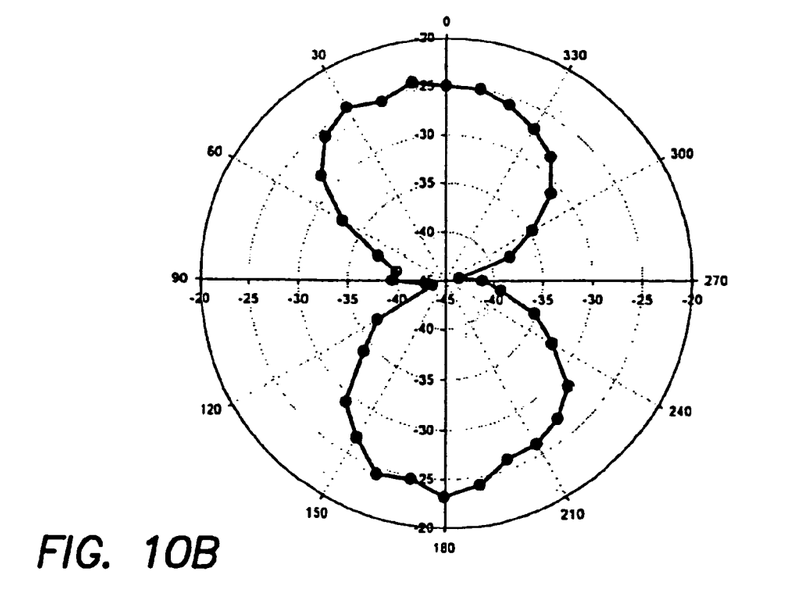

FIGS. 10A and B show the results of a second set of experiments performed to determined the effect of the device's orientation on the strength of the output signal. FIG. 10A shows the effect of the device being rotated about the length of the cantilevers, while FIG. 10B shows the effect of the device being rotated about the width of the cantilevers. In both figures., the θ coordinates represent the amount of rotation (in degrees), and the r coordinates represent the amount of the cantilevers' frequencey response (indB) The results show that the output is strongest when the device is oriented such that both the length and width of the cantilevers are substantially perpendicular to the incoming sound waves.

Figure 4A:
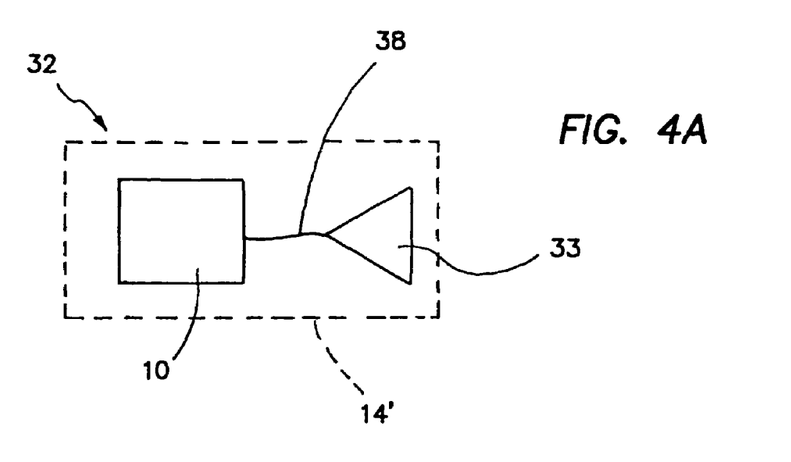
FIG. 4A is a schematic drawing showing a hearing aid incorporating a sound detecting and processing apparatus according to the present invention.

A hearing device 10 of the present invention may be employed in a variety of different ways, depending on the needs of a particular patient. For individuals with mild-to-moderate sensori-neural hearing loss, for instance, the device 10 may be used in a hearing aid 32, as shown in FIGS. 4A and B. Alternatively, in individuals with severe or profound sensori-neural hearing loss, the device 10 may be used to drive an electrode array 39 in the cochlea, as shown in FIGS. 5A, B and 6A, B.

Figure 4B:
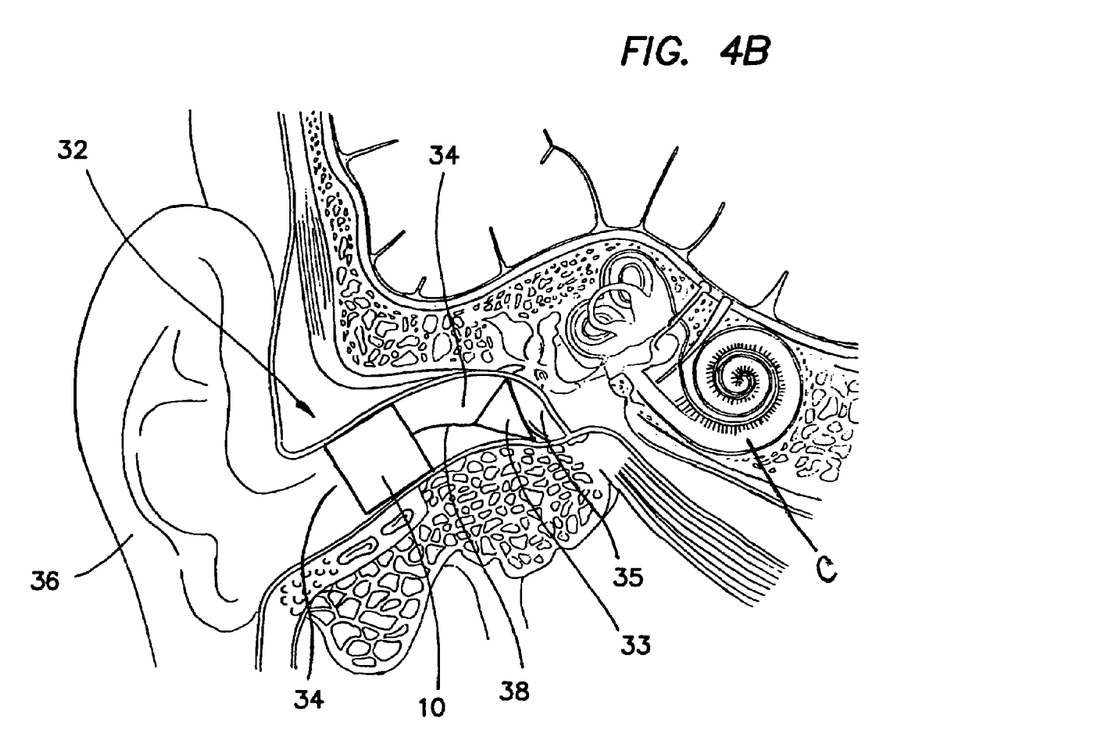
FIG. 4B is a schematic drawing showing the hearing aid of FIG. 4A positioned within the ear canal of a human patient.

The hearing aid 32 shown in FIG. 4A comprises the device 10, and a speaker 33 which is coupled to the device 10 by means of conventional wiring 38. Both the speaker 33 and the device 10 are preferably encased in a housing 14' (shown in phantom) that is dimensioned and configured to fit securely, comfortably and unobtrusively in a patient's ear canal 34, in close proximity to the tympanic membrane 35 as shown in FIG. 4B. For optimum acoustic results, the housing 14' is configured to maintain the resonator array 28 in a position substantially perpendicular to the ear canal 34.

Alternatively, the device 10 may be housed separately from the speaker 33, and may be worn behind the ear, or even elsewhere on the body, depending on the patient's individual needs and preferences. In addition, the connection between the device 10 and the speaker 33 may be wireless.

Figure 5A:
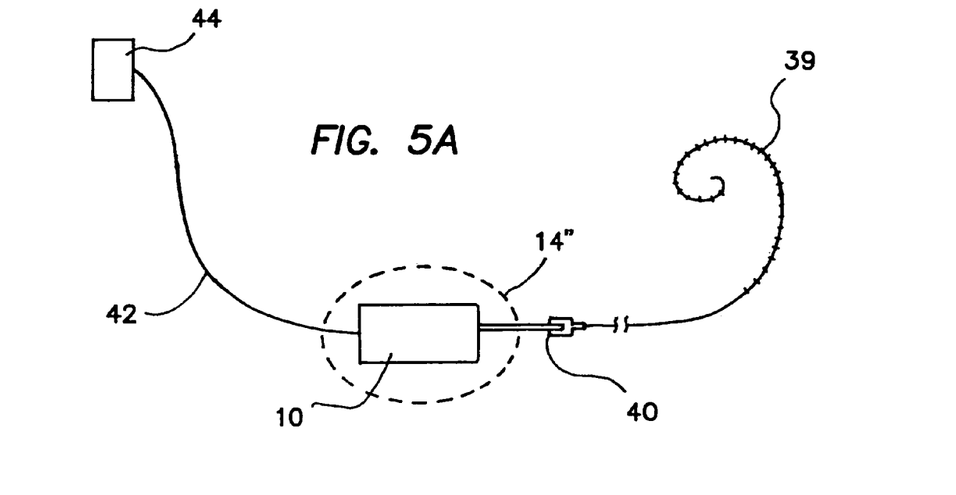
FIG. 5A is a schematic drawing showing one embodiment of an implantable hearing enhancement device incorporating a sound detecting and processing apparatus according to the present invention.

FIG. 5A shows an implantable embodiment of the invention wherein the device 10 is coupled at one end to a cochlear electrode array 39. The electrode array 39 may be of any commercially available type, for instance the type used in the Nucleus® 24 Contour device manufactured by Cochlear Corporation of Englewood, Colo. Preferably, a releasable connection 40 is provided between the electrode array 39 and the device 10, so that the device 10 can be replaced if necessary without removing the electrode array 39. The opposite end of the device 10 is coupled by means of elongated wiring 42 to a RF/power receiver coil 44, which allow post-surgical gain adjustment as well as recharging of the device's battery.

Figure 5B:
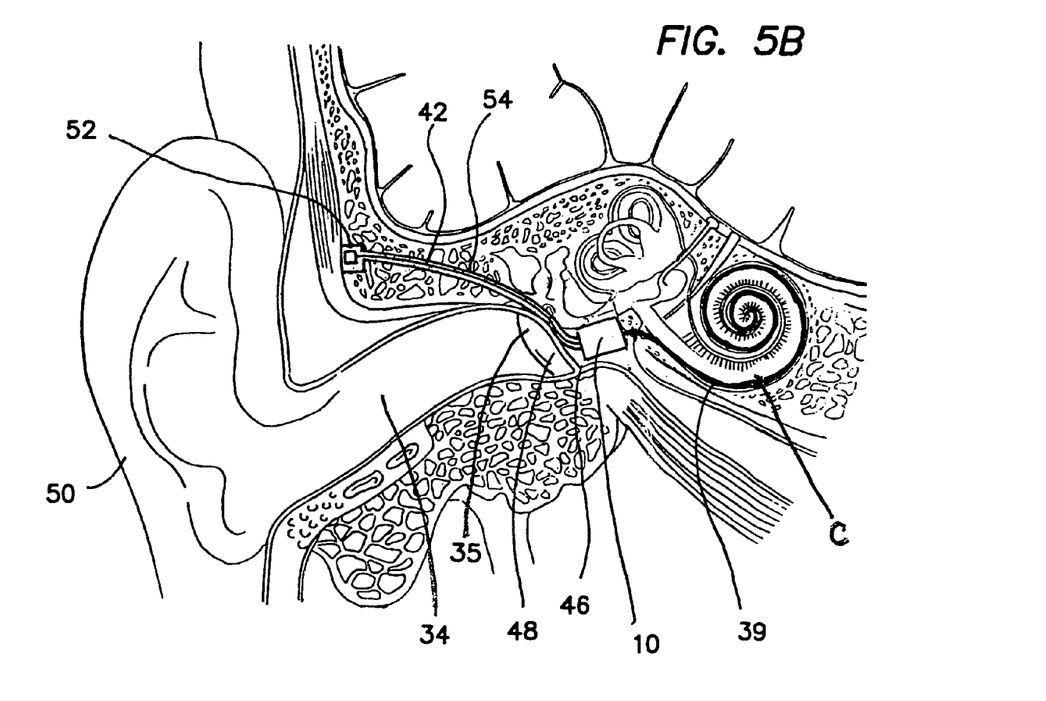
FIG. 5B is a schematic drawing showing the implantable hearing enhancement device of FIG. 5A implanted in the middle ear of a human patient.

The device 10 is preferably encased in a housing 14" (e.g. an enclosure, box, pad, pillow, disc, sponge or member(s) which fit into the desired anatomical cavity and hold the device 10 in desired position and/or orientation). In the particular embodiment shown the housing 14" is . . . designed to maintain the device in a fixed position within the tympanic cavity, or middle ear, 46 of a patient, desirably with the resonator array extending substantially perpendicuarly with respect to the patient's tympanum 48. The housing 14" may be formed of a deformable and or resiliently compressible material designed to substantially fill and conform to the contours of the tympanic cavity 46, as shown in FIG. 5B. In this arrangement, the RF/power receiver coil 44 is implanted subcutaneously behind the patient's external ear 50 within a hole or notch 52 surgically sculpted in the mastoid cortical bone. The connecting wire 42 extends through a passageway 54 drilled between the notch 52 and the tympanic cavity 46.

Figure 6A:
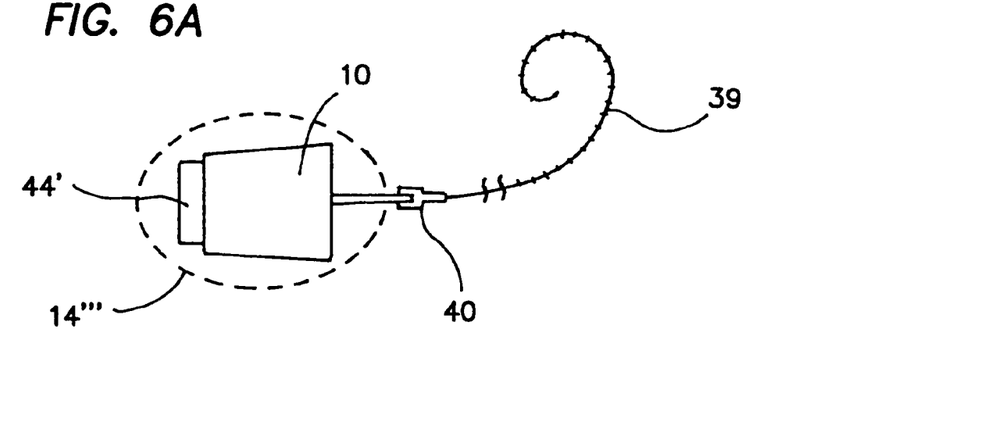
FIG. 6A is a schematic drawing showing an alternate embodiment of an implantable hearing enhancement device incorporating a sound detecting and processing apparatus according to the present invention.
Figure 6B:
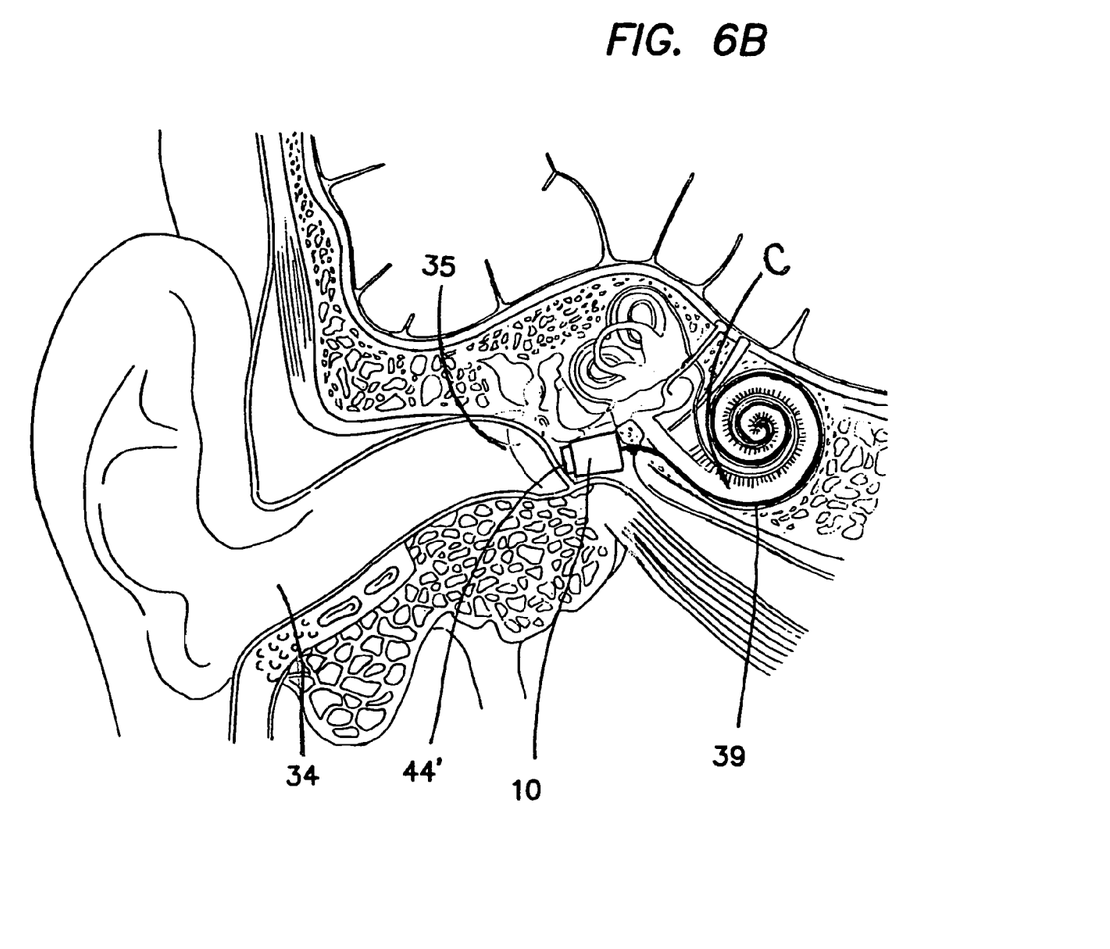
FIG. 6B is a schematic drawing showing the implantable hearing enhancement device of FIG. 6A implanted in the middle ear of a human patient.

FIG. 6A shows an alternate implantable embodiment of the invention wherein the RF/power receiver coil 44' is directly coupled to and encased in a common housing 14''' with the device 10. The electrode array 39 and releasable connection 40 are the same as in the previously described embodiment. As seen in FIG. 6B, this embodiment allows the RF/power receiver coil 44' to be implanted in the middle ear 48 with the device 10, rather than in the mastoid cortical bone. This highly compact and simple arrangement eliminates the need for cutting or drilling of bone, thus reducing the risk of infection, minimizing trauma, and shortening the patient's recovery time. In at least some applications, this embodiment may be implanted by way of a trans-tympanic implantation procedure with no external skin incision and no borring of skull bone. For example, a scope may be inserted into the ear canal 34 such that the operator may visualize the tympanic membrane 35. Instrument(s) may be inserted into the ear canal 34 past the scope (or through a working channel formed in the scope) and such instruments may be used to incise or create an opening in the tympanic membrane 35. Thereafter, the electrode array 39 may be advanced through the opening formed in the tympanic membrane 35 and inserted into the cochlea C, as shown in FIG. 6b. Thereafter, the housing 14''' containing the device 10 and the RF/power receiver coil 44' is inserted through the opening formed in the tympanic membrane 35 to a position immediately behind the tympanic membrane 35, as is also shown in FIG. 6b. The releasable connector 40 is connected prior to or after positioning of the housing 44''', thereby creating electrical connection between the device 10 and the intra-cochlear electrode array 39. The opening in the tympanic membrane 35 may then be closed if necessary such that the tympanic membrane 35 will heal and will remain functional. The scope and the operative instruments are removed from the ear canal after the trans-tympanic implantation procedure is complete. Thereafter, an RF transmitter apparatus may be inserted into the ear canal 34 and may be used to effect gain adjustment and/or battery recharging, when needed.

Figure 7:
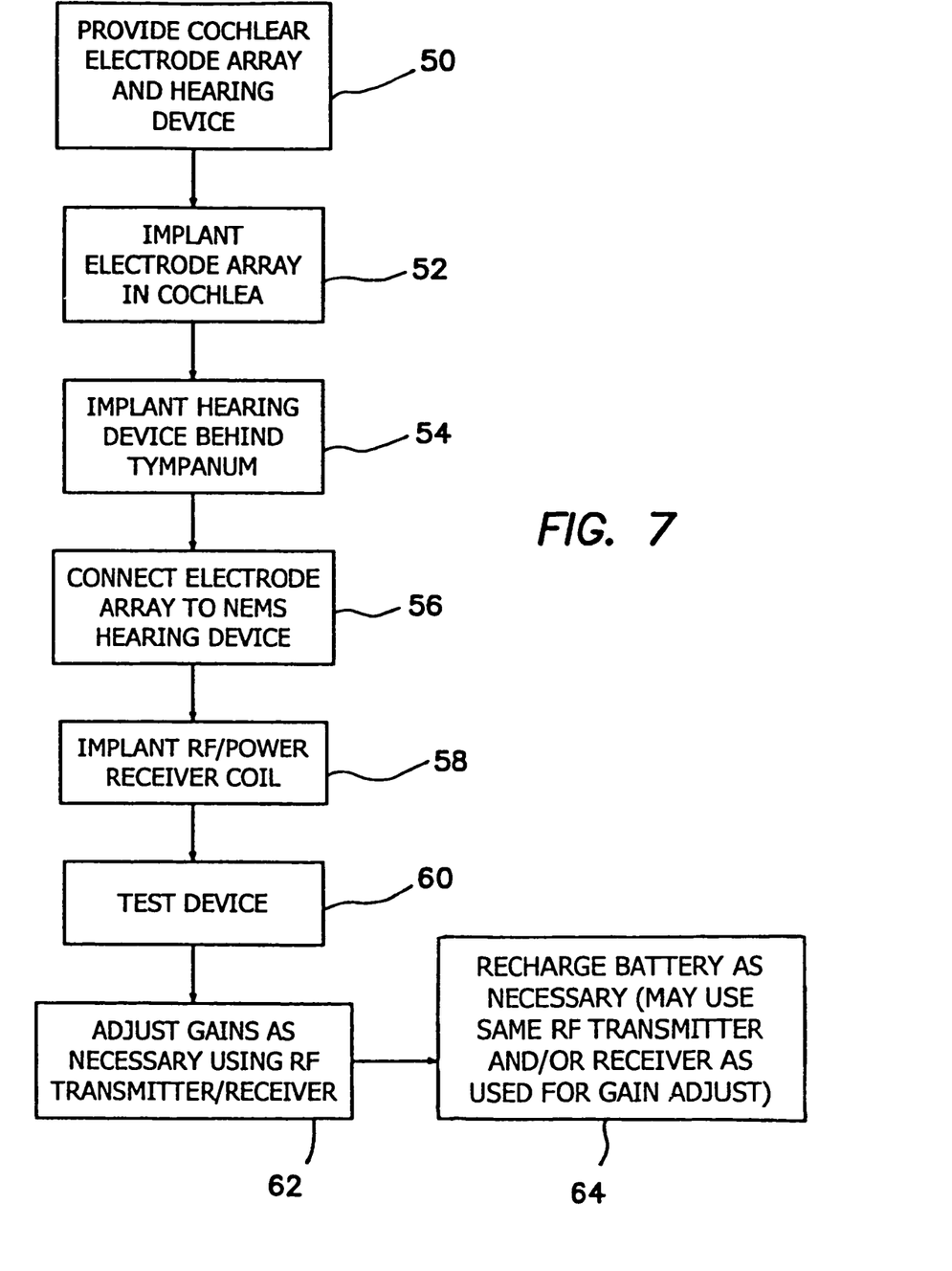
FIG. 7 is a flow chart outlining a method of treating hearing loss or impairment using the hearing enhancement device of the present invention.

An exemplary method of treating hearing loss or impairment according to the present invention will now be described with reference to FIGS. 7 and 8.

Initially (block 50), a surgeon is provided with the hearing device 10 described above, as well as a standard cochlear electrode array 39, such as the aforementioned Nucleus® 24 Contour electrode. Prior to surgery, the gains on the device are set as needed according to the patient's degree of hearing impairment.

After the patient has been prepared for surgery with a local or general anesthetic, the electrode array 39 is implanted in the patient's cochlea 42 (block 52). Various techniques are known for implanting the array in the cochlea 42. However, in one procedure, the surgeon begins by making a post-auricular incision of appropriate size. The surgeon then pulls the patient's ear 36 forward, and with a scalpel, creates a channel along the posterior ear canal 34 between the surface of the bone and the overlying skin and fascia. The surgeon then extends the channel down the posterior ear canal 34 until the annular ring of the tympanic membrane 35 is reached. The annular ring is then dissected, and folded back to expose the middle ear space, or tympanic cavity, 48. The electrode array 39 is then inserted (block 52) through the middle ear and into the cochlea 42, via either the round window 66 of the cochlea, or through a cochleostomy drilled to one side of the round window 66. In the third step of the method, (block 54), the hearing device 10 may then be inserted in the tympanic cavity, preferably via the same channel in the posterior ear canal 34 through which the electrode array 39 was inserted. After insertion, the device 10 is placed in an acoustically optimum position (i.e. cantilevers extending substantially perpendicularly with respect to the tympanum), and fixed in place adjacent the tympanic membrane 35, for instance by press fitting it into a recess formed in the temporal bone posterior to the ear, or by means of adhesive or mechanical fasteners such as screws. Next, the device 10 is coupled to the electrode array, preferably by means of a releasable connection 47 (block 56).

Next, an RF/power receiver coil 44 is implanted (block 58), either in a hole 46 in the patient's mastod cortical bone, as shown in FIG. 5 or in the tympanic cavity 48 itself, as shown in FIG. 6.

After the patient has fully recovered from the implantation procedures, the patient's hearing is tested (block 60) using standard audiological tests. At this time, the device's gains may be adjusted, if necessary, using a conventional RF transmitter (block 62) After the testing is performed and gains adjusted as needed, no specific maintenance of the device 10 is required, except for periodically recharging the battery (block 64) using a similar, if not the same, RF transmitter used to adjust the gains.

Figure 8:
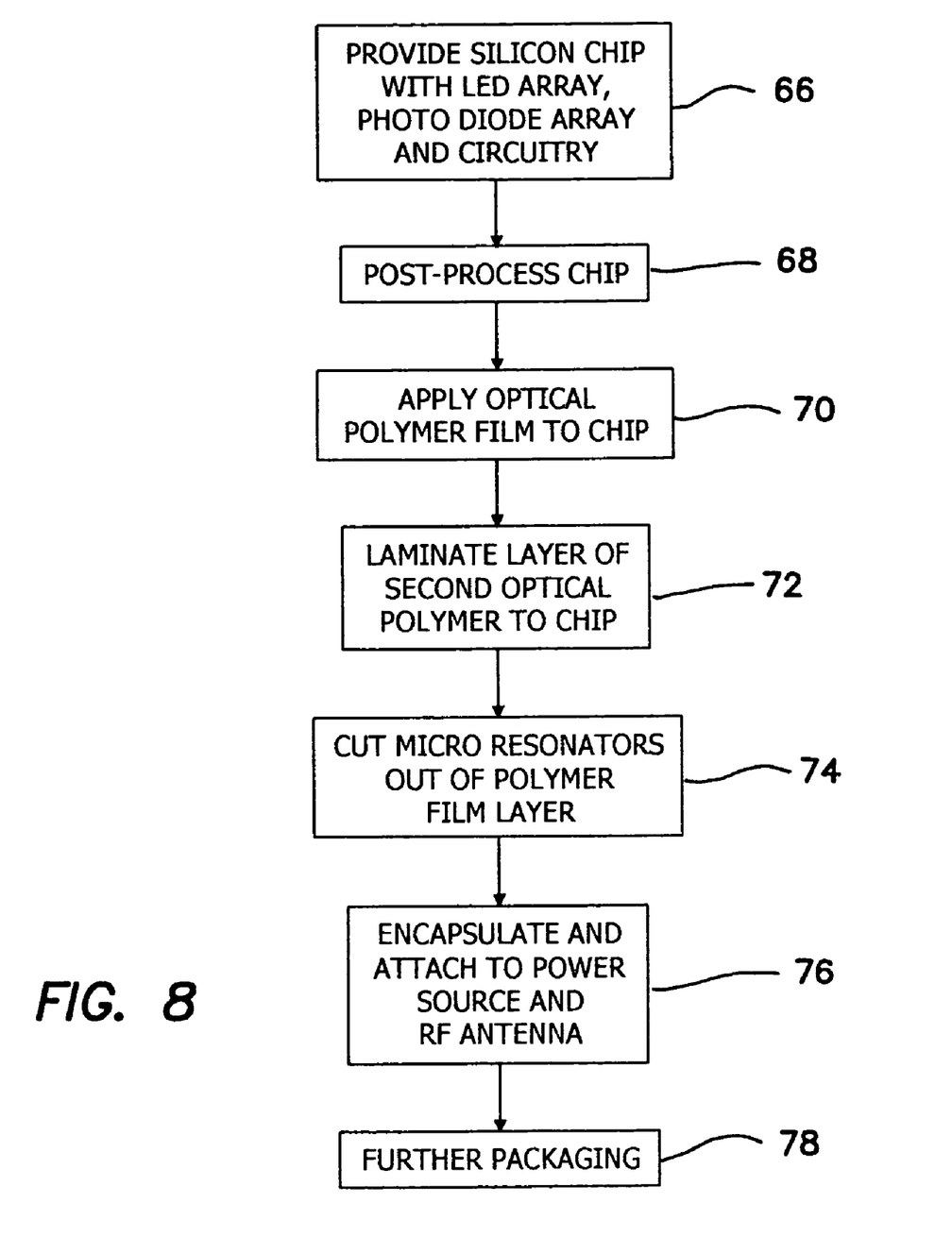
FIG. 8 is a flow chart outlining a method of making a sound detecting and processing apparatus according to the present invention.

The flow chart of FIG. 8 outlines a method of making a vibration detector/transducer 10 of the present invention in a highly miniaturized form that is particularly useful for hearing enhancement applications.

First (block 66), a standard silicon microchip 22 including an LED array 24, photodiode array 26, and circuitry 38 for converting light into electrical signals is provided. This type of chip 22 may be simply and inexpensively mass-produced using conventional semiconductor fabrication processes. The circuitry 38, which also includes programmable resistors with RF interface, is conventional, and is commercially available, but would have its components scaled down appropriately to fit the micromechanical environment of the present invention.

After the chip 22 has been obtained, the chip 22 is post-processed (block 68) by forming a cavity 69 within which the subsequently formed resonators 28 will vibrate in response to sound. The cavity is formed using a standard inductive coupled plasma deep silicon etch process.

Next (block 70), a layer of optical material such as transparent polymer film is applied over the chip 22, followed by second optical layer(s) lamination (block 72), which may or may not be the same material as the first.

After the layer(s) of optical material have been laminated to the chip 22, the resonator array 28 is cut out of the optical layers using high energy, ultraviolet laser ablation under atmospheric conditions (block 74). Laser ablation is a standard tool for industrial processes and is widely used, for instance, in the manufacture of flat-screen displays.

The device 12, which includes the chip 22 and arrays 24, 26 and 28, is then packaged in an encapsulate or housing that provides environmental protection, supplies battery power for running the device, and facilates the physical interface to the inner ear via eaither a speaker 33 in a digital hearing aid or an electrode array 39 in a cochlear implant. The housing 14 is preferably injection-molded plastic coated with a soft-skinned, biocompatible polymer, and, for implantable applications, is sterilizable. The device 12 may be secured within the housing 14 in a variety of ways, for instance it may be epoxy-glued to a substrate within the housing, and/or wire-bonded in place.

Next (block 76), the encapsulated device 12 is attached to the battery housing 16, which may also include an RF antenna (not shown), and to an adapter or end cap 18 configured to facilitate physical interface between the vibration detector/transducer 12 and the inner ear of a hearing-impaired patient. The integrated device 12, housing 16, and adapter 18 may optionally be packaged still further (block 78) by placement in an acoustic or positioning housing designed to isolate ambient vibrations from airborne sound and/or to maintain the resonator array 28 in an optimum orientation relative to (i.e. substantially perpendicular to) incoming soundwaves.

While this invention has been described with respect to various specific examples and embodiments, various modifications and alternate applications will be readily apparent to those skilled in the art. For instance, the device may be driven by a power source other than the battery disclosed above, including, for example, a solar energy device, or a inertial/mechanical device actuated by a patient's head or body movements. In addition, more than one device or component of the device may be provided in order to achieve redundancy, thus canceling out background noise or eliminating echoes, depending on the application. It will also be understood that the device need not be limited to body-worn hearing devices, but can also be used in remote listening devices such as wiretaps or "bugs", and also in non-acoustic devices such as earthquake sensors and the like.

Accordingly, it will be appreciated that the invention is not limited to the specific embodiments described above, and that it can be variously practiced within the scope of the following claims.

What is claimed is:

1. A vibration detector and transducer, comprising:
   a light source for emitting light signals;
   a light detector for receiving light signals emitted from the optical source and converting the received light signals to electrical signals;
   an array of optical waveguide resonators positioned between the light source and the light detector, each resonator being positioned to receive vibration waves and each resonator having a different resonant frequency such that each resonator will modulate the intensity of the light passing between the optical source and the light detector in response to the vibrations received by the resonator; and
   an acoustic housing surrounding the light source, the light detector, and the optical waveguide resonators, the housing being configured to isolate ambient vibrations from airborne vibrations.

2. A vibration detector and transducer according to claim 1, wherein the vibration waves comprise acoustic waves.

3. A vibration detector and transducer according to claim 1, wherein the vibration waves comprises seismic waves.

4. A vibration detector and transducer according to claim 1, wherein each of the resonators comprises a cantilever having a predetermined length, and wherein the resonant frequency of the resonator is proportional to both geometric and physical properties of the cantilever.

5. A vibration detector and transducer according to claim 1, wherein each resonator comprises a polymeric material.

6. A vibration detector and transducer according to claim 1, wherein each resonator has a Q-factor lower than the Q-factor of an identically configured and dimensioned resonator formed of silicon.

7. A vibration detector and transducer according to claim 1, wherein each resonator comprises a material having a Young's Modulus lower than the Young's Modulus of silicon.

8. A vibration detector and transducer according to claim 5, wherein the material has a Young's Modulus of about 4.4 GPa.

9. A vibration detector and transducer according to claim 1, wherein the vibration detector and transducer is sized and configured to be implanted in a human ear.

10. A vibration detector and transducer according to claim 9, wherein the vibration detector and transducer is sized and configured to be implanted in the middle ear of a human.

11. A vibration detector and transducer according to claim 1, wherein the light source comprises an LED array.

12. A vibration detector and transducer according to claim 1, wherein the light detector comprises a photodiode array.

13. An apparatus for enhancing hearing in a human or veterinary patient, said apparatus comprising:
    a light source for emitting light signals;
    a light detector for receiving light signals emitted from the optical source and converting the received light signals to electrical signals;
    an array of optical waveguide resonators positioned between the light source and the light detector, each resonator being positioned to receive sound and each resonator having a different resonant frequency such that each resonator will modulate the intensity of the light passing between the optical source and the light detector in relation to the sound received by the resonator;
    a housing encasing at least one of the light source, the light detector and the array of optical waveguide resonators, the housing being configured to be worn on or in the body of the patient wherein the housing is configured to isolate ambient vibrations from airborne sound.

14. An apparatus according to claim 13, wherein each of the resonators comprises a cantilever having a predetermined length, and wherein the resonant frequency of the resonator is proportional to both geometric and physical properties of the cantilever.

15. An apparatus according to claim 13, wherein each resonator comprises a polymeric material.

16. An apparatus according to claim 13, wherein each resonator has a Q-factor lower than the Q-factor of an identically dimensioned resonator formed of silicon.

17. An apparatus according to claim 13, wherein each resonator is formed of a material having a Young's Modulus lower than the Young's Modulus of silicon.

18. An apparatus according to claim 17, wherein the material has a Young's Modulus of about 4.4 GPa.

19. An apparatus according to claim 13, wherein the light source, the light detector and the array of optical waveguide resonators are encased in the housing, and wherein the housing is sized and configured to be implanted in the ear.

20. An apparatus according to claim 13, wherein the light source comprises an LED.

21. An apparatus according to claim 13, wherein the light detector comprises a photodiode array.

22. An apparatus according to claim 13, wherein the light source, the light detector and the array of optical waveguide resonators are formed on a silicon microchip.

23. A method of detecting vibrations and converting the vibrations into electrical signals, the method comprising:
    providing a plurality of optical waveguide resonators, each having a different resonant frequency and being surrounded by a housing configured to isolate ambient vibrations from airborne vibrations;
    causing the optical waveguide resonators to receive an incoming vibration wave;
    directing light through the resonators, such that the light is modulated by vibration of at least one of the resonators;
    receiving the modulated light; and
    converting the modulated light into electrical signals.

24. A method according to claim 23, wherein the step of providing a plurality of optical waveguide resonators comprises placing the resonators in an acoustically optimum orientation relative to the incoming vibration wave.

25. A method according to claim 23 wherein the step of providing a plurality of optical waveguide resonators comprises positioning the resonators in a substantially perpendicular orientation relative to the incoming vibration wave.

26. A method according to claim 23, wherein the wave is an acoustic wave.

27. A method according to claim 23, wherein the wave is a seismic wave.

28. A method for treating hearing loss or impairment in a human or veterinary patient, the method comprising the steps of:
providing a hearing enhancement device including
a light source for emitting light signals;
a light detector for receiving light signals emitted from the optical source and converting the received light signals to electrical signals; and
an array of optical waveguide resonators positioned between the light source and the light detector, each resonator being positioned to receive sounds and each resonator having a different resonant frequency such that each resonator will modulate the intensity of the light passing between the optical source and the light detector in response to the sounds received by the resonator; and
providing an interface between the hearing enhancement device and the inner ear of the patient.

29. A method according to claim 28, wherein the photodetector includes electronic circuitry for converting light signals into electrical signals, the circuitry having variable gains and means for adjusting the gains, and further comprising the steps of:
testing the patient's hearing after interface between the device and the inner ear has been made; and
adjusting the gains to optimize the patient's hearing.

30. A method according to claim 28, wherein the hearing enhancement device comprises a hearing aid worn by the patient, and wherein the step of providing an interface comprises transmitting the electrical signals from the light detector to a speaker in the hearing aid.

31. A method according to claim 28, wherein the step of providing an interface comprises implanting an electrode in proximity to the patient's auditory nerve, and driving the electrode with the electrical signals from the light detector to stimulate the patient's auditory nerve, resulting in perceptible sound to the patient.

32. A method according to claim 30, wherein the step of providing an interface further comprises a step of placing at least a portion of the hearing enhancement device in the patient's ear canal.

33. A method according to claim 32, wherein the step of placing at least a portion of the device in the patient's ear canal comprises placing the entire hearing enhancement device in the patient's ear canal.

34. A method according to claim 32, wherein the step of placing at least a portion of the device in the patient's ear canal comprises positioning the device such that the resonators extend substantially perpendicular to the ear canal.

35. A method according claim 28, wherein the step of providing an interface comprises implanting at least a portion of the hearing enhancement device in the patient's body.

36. A method according to claim 28, wherein the step of providing an interface comprises implanting at least a portion of the hearing enhancement device in the patient's middle ear.

37. A method according to claim 36, wherein the step of implanting at least a portion of the hearing enhancement device in the patient's middle ear comprises implanting the entire hearing enhancement device in the patient's middle ear.

38. A method according to claim 36, wherein the step of implanting at least a portion of the hearing enhancement device in the patient's middle ear comprises positioning the device such that the resonators extend substantially perpendicular to the patient's tympanum.

39. A method according to claim 29, wherein the circuitry includes RF interface, and wherein:
the step of implanting at least a portion of the hearing device comprises implanting an RF receiver in the patient's body; and
the step of adjusting the gains comprises adjusting the gains using an RF transmitter located outside the body.

40. A method of making a hearing enhancement device, comprising the steps of:
providing an LED array, a photodiode array, and an optical waveguide resonator array, the resonator array being configured to receive sound from an external source and being positioned between the LED array and the photodiode array so as to modulate light transmitted from the LED array and the photodiode array in response to the received sound; and
packaging the arrays in a housing configured to be worn in or on the body of a patient by encasing the arrays in an acoustic housing configured to isolate ambient vibrations from airborne sound.

41. A method according to claim 40, wherein the step of packaging comprises encasing the arrays in a housing sized and configured to fit within the patient's ear canal.

42. A method according to claim 40, wherein the step of packaging comprises encasing the arrays in a housing sized and configured to fit within the patient's middle ear.

43. A method according to claim 40, further comprising a step of providing a power source for driving the device.

44. A method according to claim 43, wherein the power source comprises a battery.

45. A method according to claim 40, wherein the step of packaging comprises:
providing a first housing for the arrays and a second housing for the battery; and
coupling the first housing to the second housing.

46. A method according to claim 40, wherein the step of providing comprises:
fabricating a silicon microelectronic chip including an LED array, a photodiode array, and circuitry for converting light signals into electrical signals;
forming a cavity in the chip; and
forming the optical waveguide resonator array over the cavity.

47. A method according to claim 46, wherein the step of forming the optical waveguide resonator array comprises:
laminating a layer of transparent polymer material to the chip; and
removing portions of the polymer material to create a plurality of cantilevers.

48. A method according to claim 47, wherein the step of removing portions of the polymer material comprises ablating the polymer material using laser energy.

49. A method according to claim 47, wherein the polymer material comprises an epoxy material.

50. A method according to claim 41, wherein the step of packaging comprises encasing the arrays in a housing configured maintain the arrays in a position substantially perpendicular to the ear canal when the device is inserted in the canal.

51. A method according to claim 42, wherein the step of packaging comprises encasing the arrays in a housing configured maintain the arrays in a position substantially perpendicular to the patient's tympanic membrane when the device is implanted in the middle ear.

* * * * *